United States Patent
Bhat et al.

(10) Patent No.: US 11,742,770 B2
(45) Date of Patent: Aug. 29, 2023

(54) POWER CONVERTER BUSBAR FOR USE ACROSS A RANGE OF FREQUENCIES

(71) Applicant: FORD GLOBAL TECHNOLOGIES, LLC, Dearborn, MI (US)

(72) Inventors: Krishna Prasad Bhat, Canton, MI (US); Chingchi Chen, Ann Arbor, MI (US); Michael W. Degner, Novi, MI (US); Man Prakash Gupta, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 113 days.

(21) Appl. No.: 17/388,725

(22) Filed: Jul. 29, 2021

(65) Prior Publication Data

US 2023/0030670 A1  Feb. 2, 2023

(51) Int. Cl.
*H02M 7/00* (2006.01)
*B60L 53/20* (2019.01)
*H02M 7/5387* (2007.01)

(52) U.S. Cl.
CPC ............ *H02M 7/003* (2013.01); *B60L 53/20* (2019.02); *H02M 7/5387* (2013.01); *B60L 2210/10* (2013.01)

(58) Field of Classification Search
CPC ...... H02M 7/00; H02M 7/003; H02M 7/5387; H02M 7/523; H02M 7/4818; H02M 3/003; H02M 3/156; H02M 3/158; H02M 3/1584; H02M 3/1586; H02M 1/34; H02M 1/32; B60L 2210/10; B60L 2210/40; B60L 2210/42; B60L 53/20; B60L 53/22; H01M 50/507
See application file for complete search history.

(56) References Cited

U.S. PATENT DOCUMENTS

| | | | |
|---|---|---|---|
| 7,551,463 B2 | 6/2009 | Ros et al. | |
| 8,427,070 B2 | 4/2013 | Matsuda | |
| 9,133,825 B2 | 9/2015 | Andresen et al. | |
| 9,246,408 B2 | 1/2016 | Maeda et al. | |
| 9,742,275 B2 | 8/2017 | Chen | |
| 2006/0049890 A1* | 3/2006 | Wasaki | H03H 7/427 333/181 |
| 2012/0081193 A1* | 4/2012 | Shirakawa | H03H 7/1775 333/176 |
| 2016/0149191 A1* | 5/2016 | Farha | H01M 50/55 429/121 |

(Continued)

OTHER PUBLICATIONS

Avinash Kishore; Chetan Patki; Mohammad Anwar; William Ivan; Mehrdad Teimor; "Investigation of common mode noise in electric propulsion system high voltage components in an electrified vehicle"; Jul. 25, 2016; IEEE; 2016 IEEE Transportation Electrification Conference and Expo (ITEC) (Year: 2016).*

*Primary Examiner* — Thienvu V Tran
*Assistant Examiner* — Shahzeb K Ahmad
(74) *Attorney, Agent, or Firm* — David B Kelley; Brooks Kushman P.C.

(57) ABSTRACT

A vehicle includes a traction battery and a converter. The converter includes a switch and first and second busbars electrically connected in parallel between the traction battery and the switch. The second busbar has an inductance less than the first busbar and includes a resistor having a resistance at least an order of magnitude greater than a resistance of the first busbar.

13 Claims, 12 Drawing Sheets

(56) References Cited

U.S. PATENT DOCUMENTS

2016/0285360 A1* 9/2016 Elshaer ................ H02M 1/44
2016/0301300 A1* 10/2016 Elshaer ................ H02M 1/44
2019/0044119 A1* 2/2019 Fernandez-Galindo ....................
                                                        H01M 50/244
2019/0372063 A1* 12/2019 Xu ........................ B60R 16/04

* cited by examiner

POWER CONVERTER BUSBAR FOR USE ACROSS A RANGE OF FREQUENCIES

TECHNICAL FIELD

The present disclosure relates to a busbar for a power converter.

BACKGROUND

Power converters are commonly used on electrically powered vehicles. A power converter may include semiconductor switching devices to convert electrical energy from one form to another (e.g. DC/AC conversion). Due to setup constraints and characteristics of semiconductor devices, there may be inadvertent stray parameters (e.g. parasitic inductance and capacitance) introduced into the system. These stray parameters may cause oscillation when the converter circuit is excited during switching.

SUMMARY

A vehicle includes a traction battery and a converter. The converter includes a switch and first and second busbars electrically connected in parallel between the traction battery and the switch. The second busbar has an inductance less than the first busbar and includes a resistor having a resistance at least an order of magnitude greater than a resistance of the first busbar such that an impedance of the first busbar is greater than an impedance of the second busbar for a first predefined range of current frequencies, and the impedance of the first busbar is less than the impedance of the second busbar for a second predefined range of current frequencies that is less than the first predefined range of current frequencies.

A vehicle power system includes a traction battery and a converter. The converter includes a switch and first and second busbars electrically connected in parallel between the traction battery and the switch. The first busbar passes current having frequencies that fall within a first frequency range. The second busbar passes current having frequencies that fall within a second frequency range greater than the first frequency range and dissipates energy associated with the current having frequencies that fall within the second frequency range to damp a voltage response across terminals of the switch corresponding to the current having frequencies that fall within the second frequency range.

A converter includes a switch and first and second busbars electrically connected in parallel and to the switch. An impedance of the first busbar is greater than an impedance of the second busbar for a first predefined range of current frequencies. The impedance of the first busbar is less than the impedance of the second busbar for a second predefined range of current frequencies that is less than the first predefined range of current frequencies

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
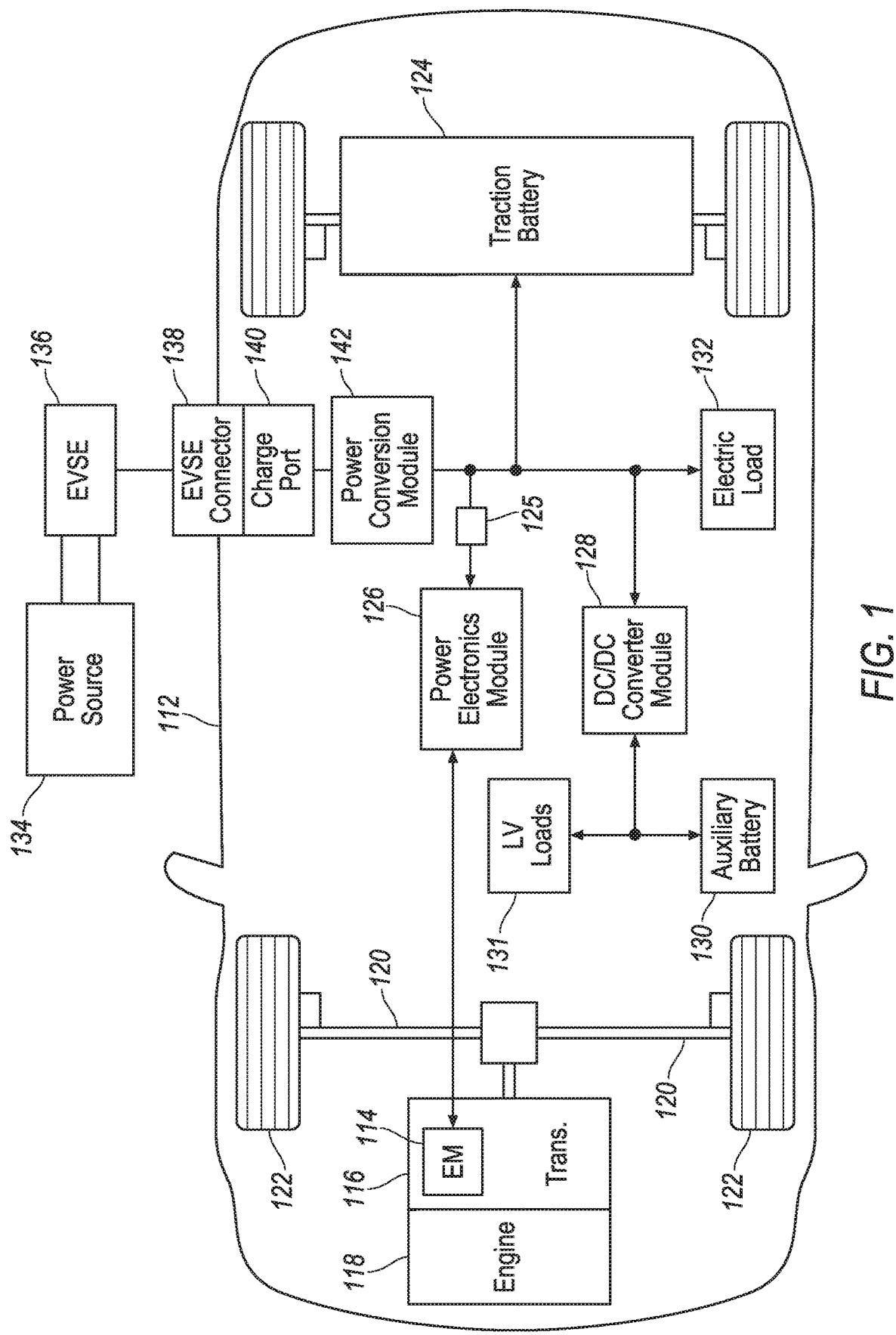
FIG. 1 illustrates a diagram of an electrified vehicle with drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a Battery Electric Vehicle (BEV). In a BEV configuration, the engine 118 may not be present. Alternatively, the vehicle 112 may be conventional vehicle having only the engine 118 without the electric machine 114.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more electric busbars 125 may connect the traction battery 124 to other components of the vehicle 112. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems having one or more low-voltage loads 131 may be electrically coupled to the auxiliary battery 130. One or more electrical loads 132 may be coupled to the high-voltage bus/rail. The electrical loads 132 may have an associated controller that operates and controls the electrical loads 146 when appropriate. Examples of the electrical loads 132 may be a fan, an electric heating element and/or an air-conditioning compressor.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or on-board power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using wireless inductive coupling.

Figure 2:
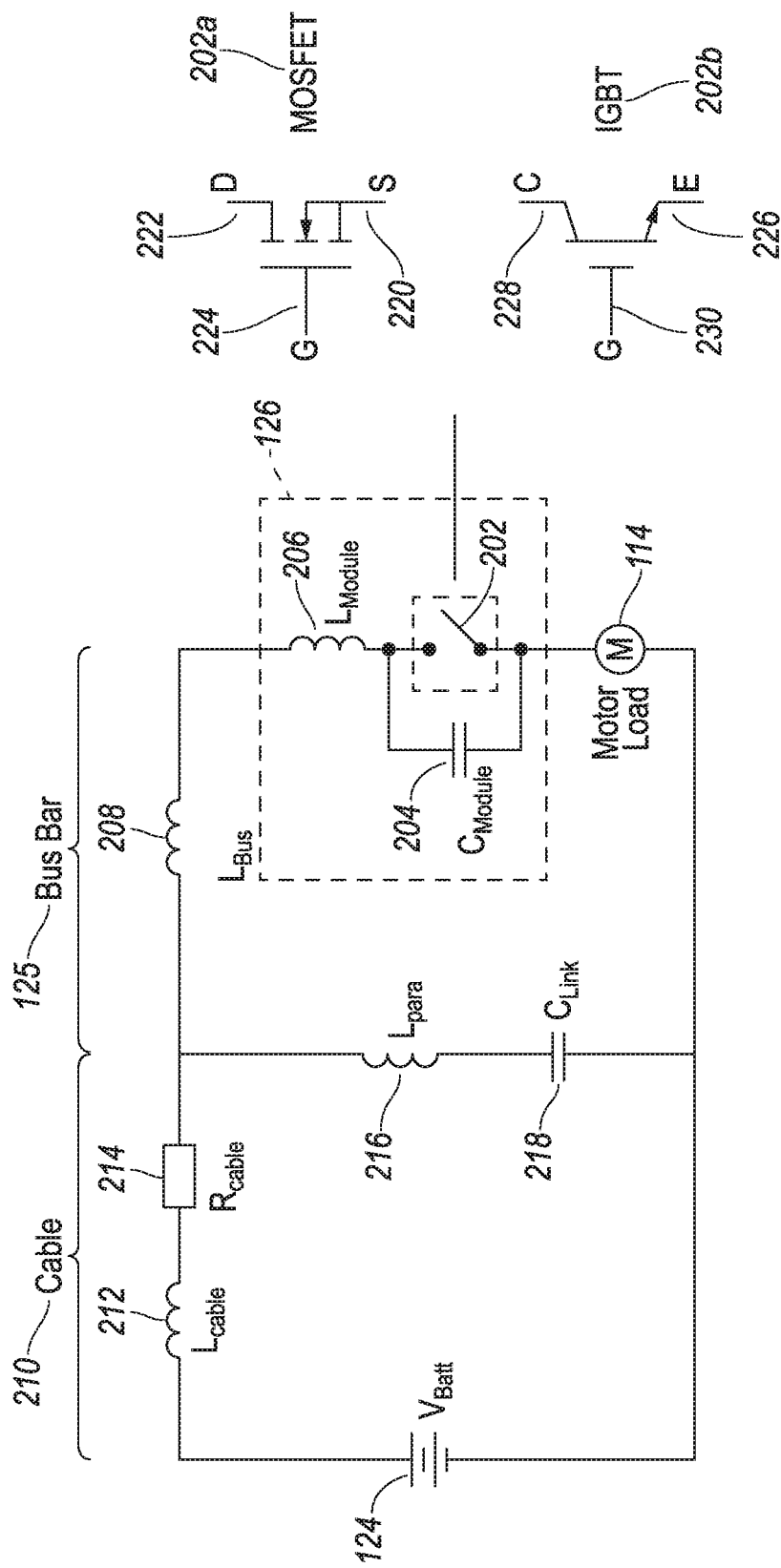
FIG. 2 illustrates a circuit diagram of an existing system.

Referring to FIG. 2, a circuit diagram of an existing system is illustrated. In FIG. 2, the power electronics module 126 is simplified for demonstrative purposes. With continuing reference to FIG. 1, the power electronics module 126 connected between the traction battery 124 and the electric machine 114 may include one or more switches 202 (only one is illustrated). The power electronics module 126 may be associated with parasitic parameters. For instance, the power electronics module 126 may be associated with a parasitic capacitance $C_{Module}$ 204 connected in parallel with the switch 202. The power electronics module 126 may be further associated with a parasitic inductance $L_{Module}$ 206 connected in series to the switch 202. The power electronics module 126 maybe connected to the battery 124 via the busbar 125 and/or battery cable 210. The busbar 125 may be associated with a parasitic inductance $L_{Bus}$ 208 connected in series to the power electronics module 126. The battery cable 210 may be associated with a cable inductance $L_{cable}$ 212 and a cable resistance $R_{Cable}$ 214 connected in series. The circuit may further include a circuit parasitic inductance $L_{Para}$ 216 in series to a DC link capacitor $C_{Link}$ 218 connected between the battery cable 210 and the busbar 125.

The switch 202 of the power electronics module 126 may be selected from a variety of types of electronics switches. As a few non-limiting examples, the switch 202 may include a metal-oxide-semiconductor field-effect transistor (MOSFET) 202a having a source terminal 220 connected to the electric motor 114, a drain terminal 222 connected to the busbar via the parasitic inductance $L_{Module}$ 206, and a gate terminal 224 configured to receive a control signal from a controller (not shown) of the power electronics module 126. Although the MOSFET 202a is a N-channel transistor as illustrated in FIG. 2, the present disclosure is not limited thereto. Alternatively, the switch 202 may include an insulated-gate bipolar transistor (IGBT) 202b having an emitter terminal 226 connected to the electric motor 114, a collector terminal 228 connected to the busbar via the parasitic inductance $L_{Module}$ 206, and a gate terminal 230 configured to receive a control signal from a controller (not shown) of the power electronics module 126. Although the IGBT 202b is a NPN transistor as illustrated in FIG. 2, the present disclosure is not limited thereto. The parasitic parameters in the system may cause undesirable oscillations when the circuit is excited during switching. Although the oscillations may occur for both MOSFET and IGBT transistors, the oscillations may be more significant when the MOSFET 202a is used in the switch 202 due to the low dynamic resistance of the transistor during a switching process.

Figure 3:
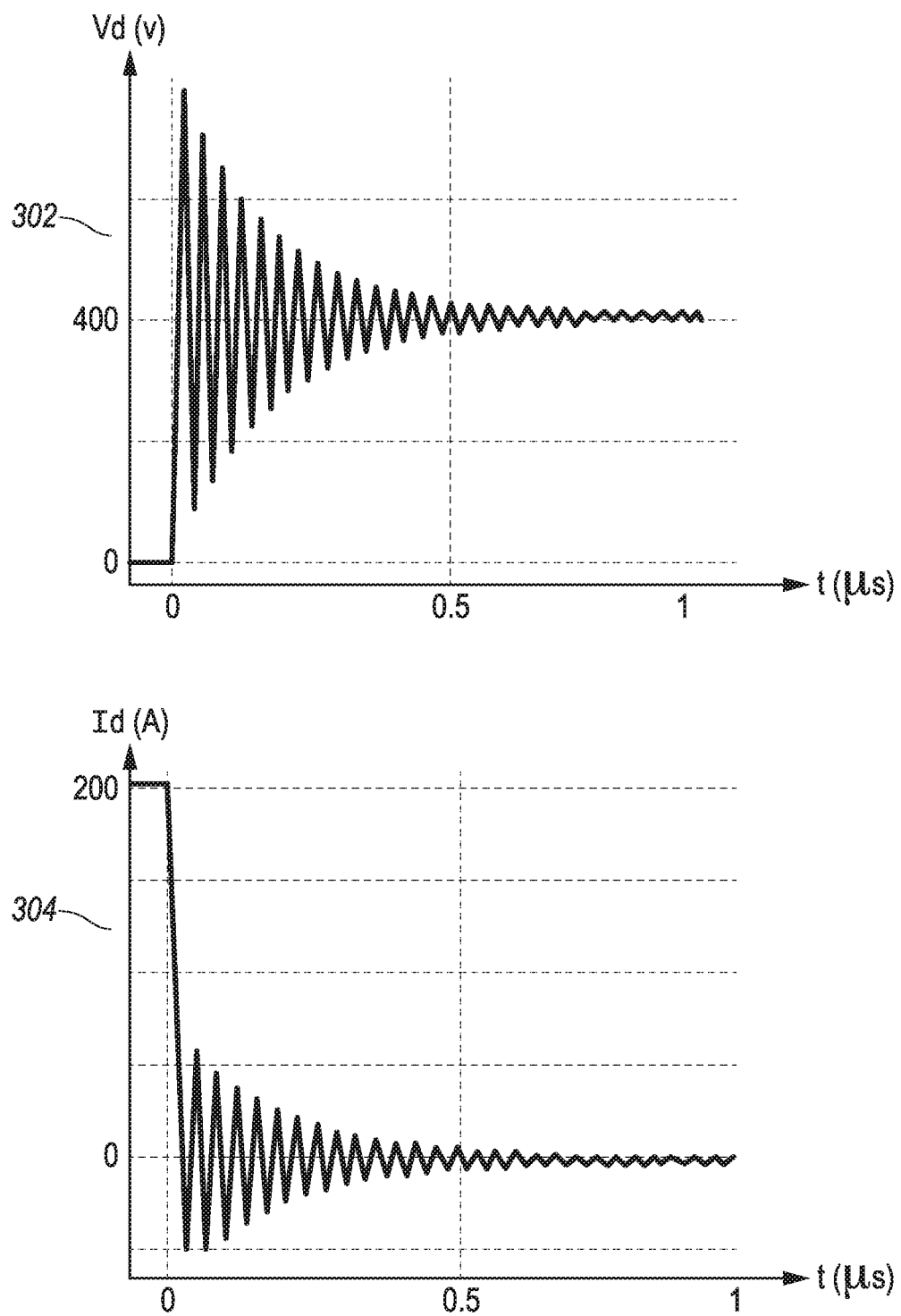
FIG. 3 illustrates waveform diagrams of the existing system.

Referring to FIG. 3, waveform diagrams 300 for the circuit 200 are illustrated. In the present embodiment, the MOSFET 202a is used as the switch 202 for illustrative purposes. A waveform diagram 302 illustrates a voltage between the drain terminal 222 and the source terminal 220 of the switch 202. A waveform diagram 304 illustrates a current flowing through the switch 202. In the present example, the voltage from the traction battery 124 is around 400V. At around time 0 μs, the switch 202 switches from a closed status to an open status. The switching activity causes an oscillation in both the voltage and the current across the switch 202. As illustrated in the diagrams, the voltage Vd increases dramatically to around 800V upon the opening of the switch 202 and continues to oscillate until around 0.5 μs when the voltage stabilizes at around 400V. Similarly, the current Id flowing through the switch 202 drops dramatically below 0V upon the opening of the switch and the current oscillation stabilizes at around 0.5 μs.

Figure 4:
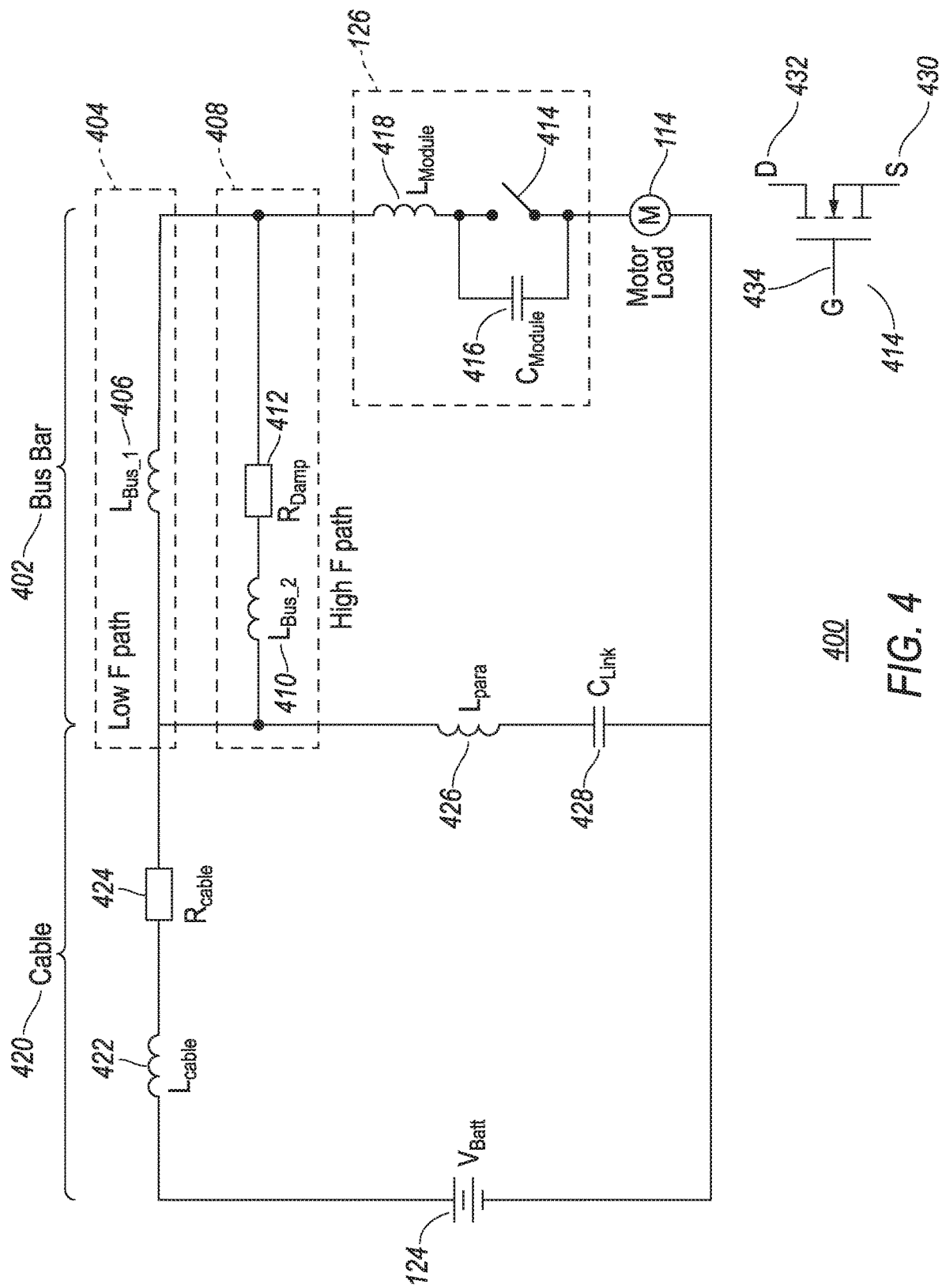
FIG. 4 illustrate a circuit diagram for a system of the present disclosure.

Referring to FIG. 4, a circuit diagram for an oscillation damping system 400 of the present disclosure is illustrated. In the present system, the busbar 402 connected between the power electronics module 126 and the traction battery 124 includes two paths connected in parallel and configured to accommodate current with different frequencies. The busbar 402 includes a first current path (primary busbar) 404 having a first bus inductance $L_{Bus\_1}$ 406 configured to accommodate low frequency currents, and a second current path (secondary busbar) 408 having a second bus inductance $L_{Bus\_2}$ 410 and a damping resistor $R_{Damp}$ 412 connected in series and configured to accommodate high frequency currents. Since the second bus inductance $L_{Bus\_2}$ is configured lower than the first bus inductance $L_{Bus\_1}$, more electric current at higher frequency will flow through the second path 408 and therefore dissipate the energy via the damping resistor $R_{Damp}$ 412. The value of the damping resistor $R_{Damp}$ may by calibrated using the following equation:

$$R_{Damp} = \sqrt{\frac{L}{C}}$$

wherein L represents the inductance of the circuit and C represents the capacitance of the circuit. In the present example, the damping resistor $R_{Damp}$ may be configured between 4-10Ω to accommodate a wide range of oscillations in a power converter. Since the first current path 404 has a lower resistance (e.g. less than 1 mΩ) compared with the second current path 408, low frequency current will flow through the first path 404. In other words, the impedance of the first current path 404 is higher than the impedance of the second current path 408 at high frequency, and the impedance of the first current path 404 is lower than the impedance of the second current path 408 at low frequency. The impedance of the first current path 404 may be represented using the following equation:

$$Z_{Path\_1} = 2\pi f L_{Bus\_1}$$

The impedance of the second current path 408 may be represented using the following equation:

$$Z_{Path\_2} = 2\pi f L_{Bus\_2} + R_{Damp}$$

Therefore, the two-path busbar design of the present disclosure does not practically reduce the general efficiency of the busbar 402 or the power electronics module 126 compared to the conventional design while the high frequency oscillation may be significantly reduced.

A simplified power electronics module circuit 126 may include one or more switches 414 (only one is shown) each of which being associated with a parasitic capacitance $C_{Module}$ 416. The power electronics module 126 may be further associated with a parasitic inductance $L_{Module}$ 418 connected in series to the switch 414. A battery cable 420 may be used to connect the traction battery with the power electronics module 126. The battery cable 420 may be associated with a cable inductance $L_{Cable}$ 422 and a cable resistance $R_{Cable}$ 424 connected in series. The circuit may further include a circuit parasitic inductance $L_{Para}$ 426 in series to a DC link capacitor $C_{Link}$ 428 connected between the battery cable 420 and the busbar 402. The switch 414 may be of various types. In the present example, switch 414 may include a MOSFET-type switch having a source terminal 430 connected to the motor load 114, a drain terminal 432 connected to the busbar 402 via the a parasitic inductance $L_{Module}$ 418, and a gate terminal 434 configured to receive a control signal from a controller (not shown) of the power electronics module 126.

Figure 5:
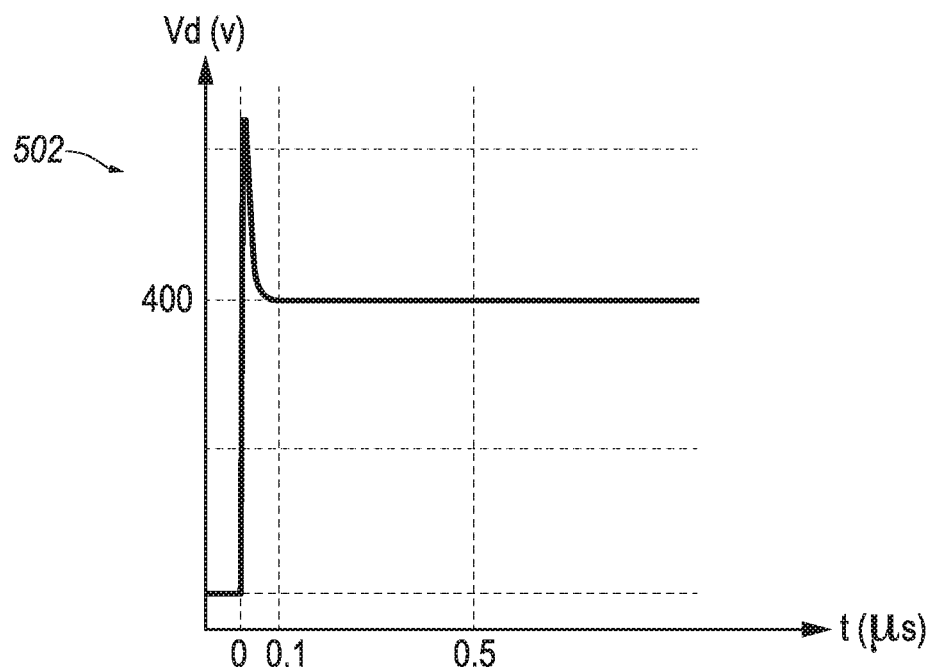
FIG. 5 illustrates waveform diagrams for the system of the present disclosure.
Figure 5:
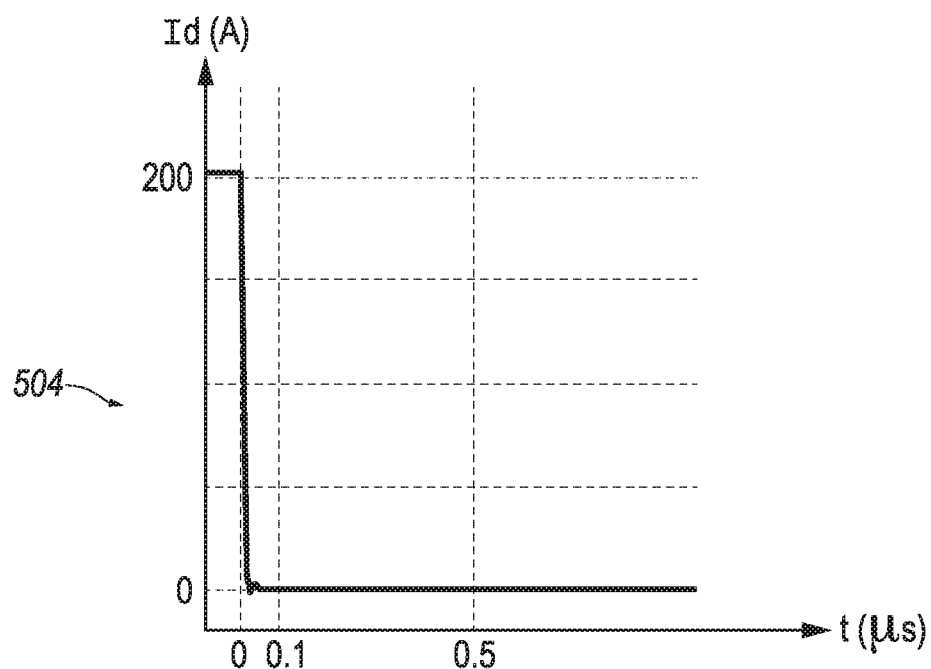

Referring to FIG. 5, waveform diagrams 500 for the circuit 400 are illustrated. In the present embodiment, a MOSFET-type switch 414 is used for illustrative purposes. A waveform diagram 502 illustrates a voltage between the drain terminal 432 and the source terminal 430 of the MOSFET switch 414. A waveform diagram 504 illustrates a current flowing through the switch 414. In the present example, the voltage from the traction battery 124 is around 400V. At around time 0 μs, the switch 414 switches from a closed status to an open status. As compared with the waveform diagrams 300 illustrated in FIG. 3, the switching activity causes a much smaller oscillation in both the voltage and the current across the switch 414. As illustrated in the diagrams, although the voltage Vd spikes from 0V to around 600V upon the opening of the switch 414, the voltage quickly stabilizes at around 400V in less than 0.1 μs. Similarly, the current Id flowing through the switch 414 stabilizes to 0V in less than 0.1 μs.

Figure 6A:
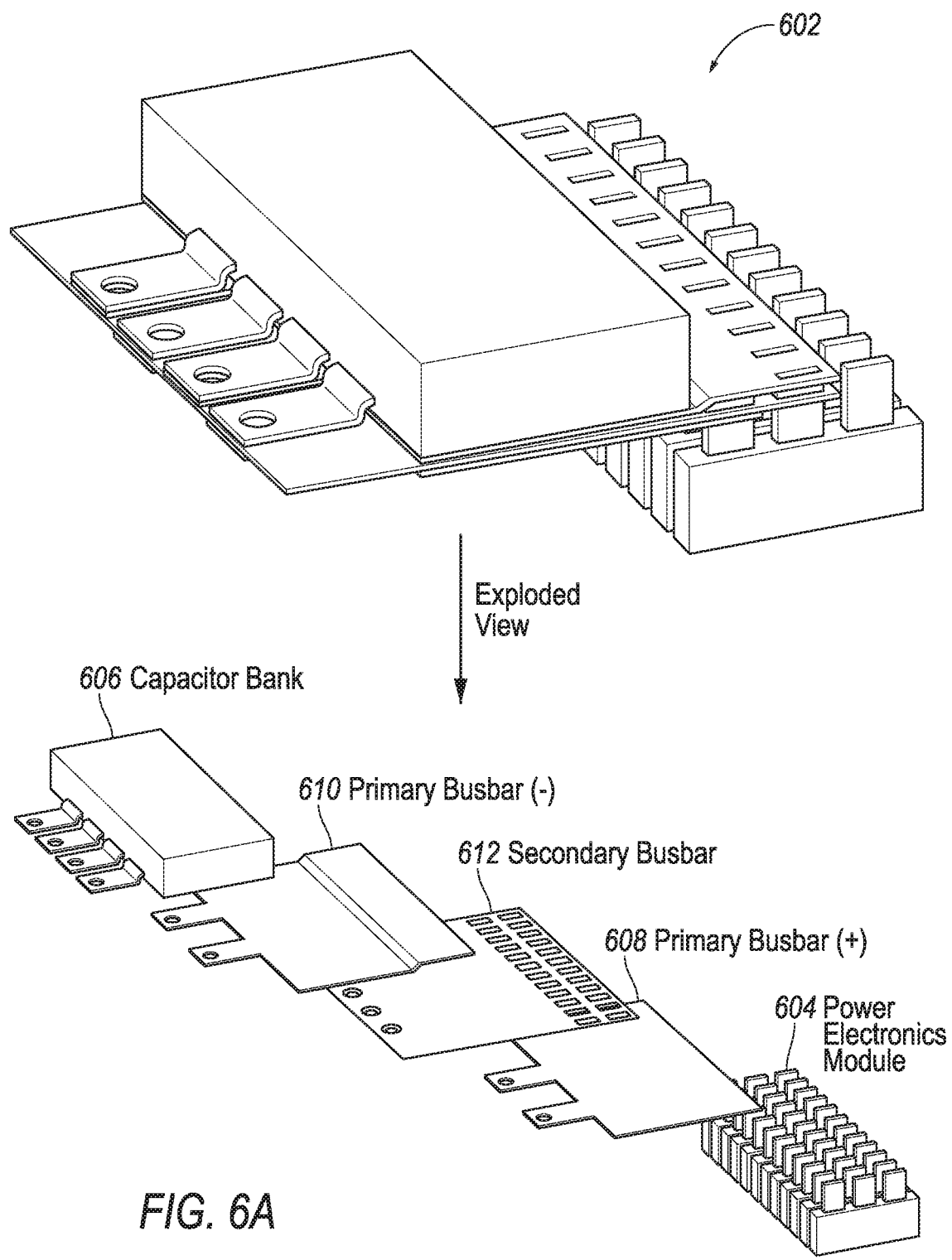
FIGS. 6A and 6B illustrate diagrams of a power converter assembly of one embodiment of the present disclosure.
Figure 6B:
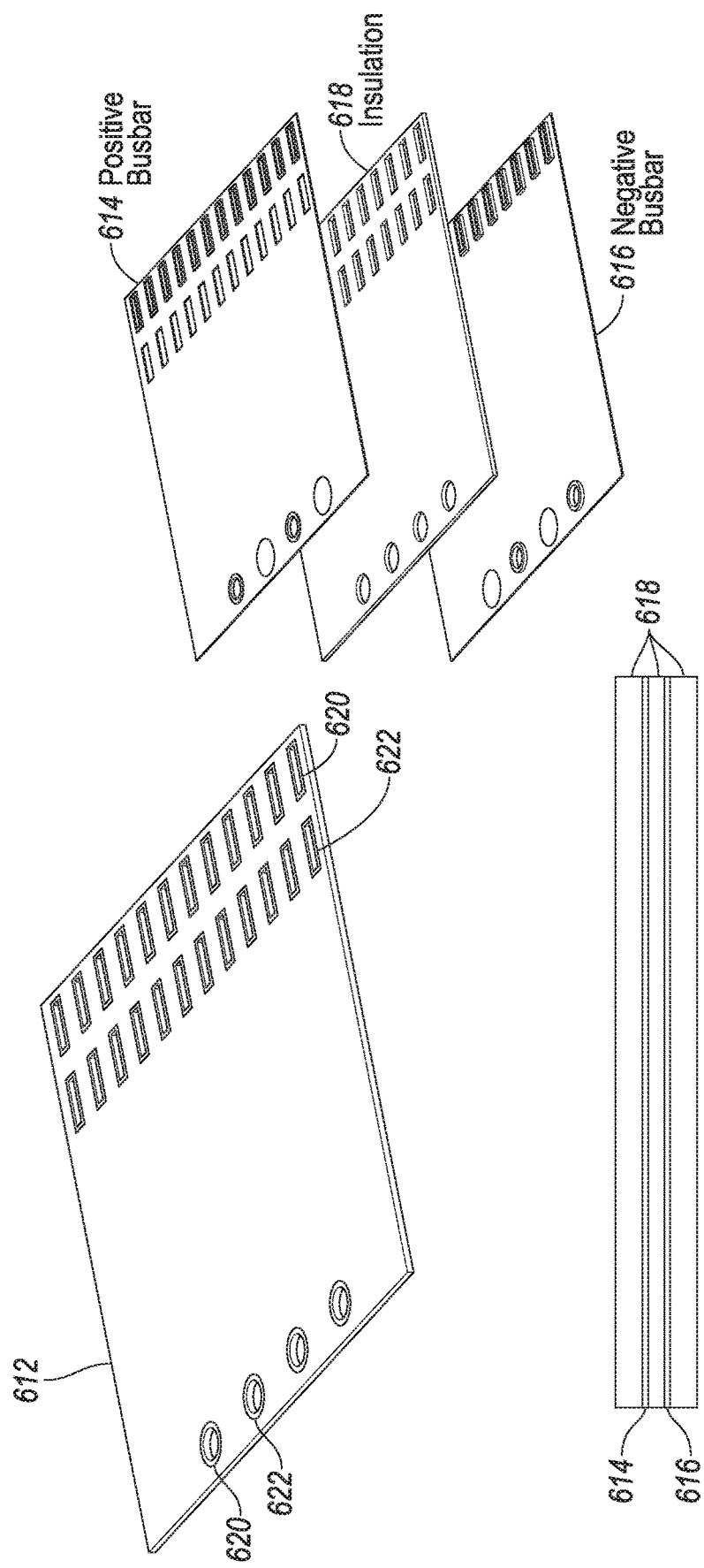

Referring to FIGS. 6A and 6B, exploded view diagrams of a converter assembly 602 having a secondary busbar of one embodiment of the present disclosure is illustrated. In the present embodiment, a power electronics module 604 may be connected to a capacitor bank 606 via positive and negative primary busbars 608, 610 and a secondary busbar 612. The secondary busbar 612 may be implemented as a busbar board in the present embodiment. The secondary busbar board 612 may be stacked between the positive primary busbar 608 and the negative primary busbar 610. FIG. 6B illustrates an exploded view diagram of the secondary busbar 612. As an example, the secondary busbar 612 may include a printed circuit board (PCB) having multiple layers. The busbar 612 may include a positive busbar layer 614 and negative busbar layer 616 both made from conductible material (e.g. copper) and separated from each other by an insulation layer 618 made from insulating material (e.g. plastic). The positive and negative busbar layers 614 and 616 may be further stacked between two insulation layers 618 having pre-punched holes to accommodate the electric terminals of the secondary bus bar 612. In the present embodiment, the busbar PCB circuit board 612 may include a plurality of openings on the outer insulation layers 618 to allow a plurality of positive terminals 620 and a negative terminals 622 to extend through for connecting to the rest of the converter 602. In the present example, the rectangular terminals on the right side of the secondary busbar 612 may be configured to connect to the power electronics modules 604, and the round terminals on the left side of the secondary busbar 612 may be configured to connect to capacitor bank 606.

Figure 7A:
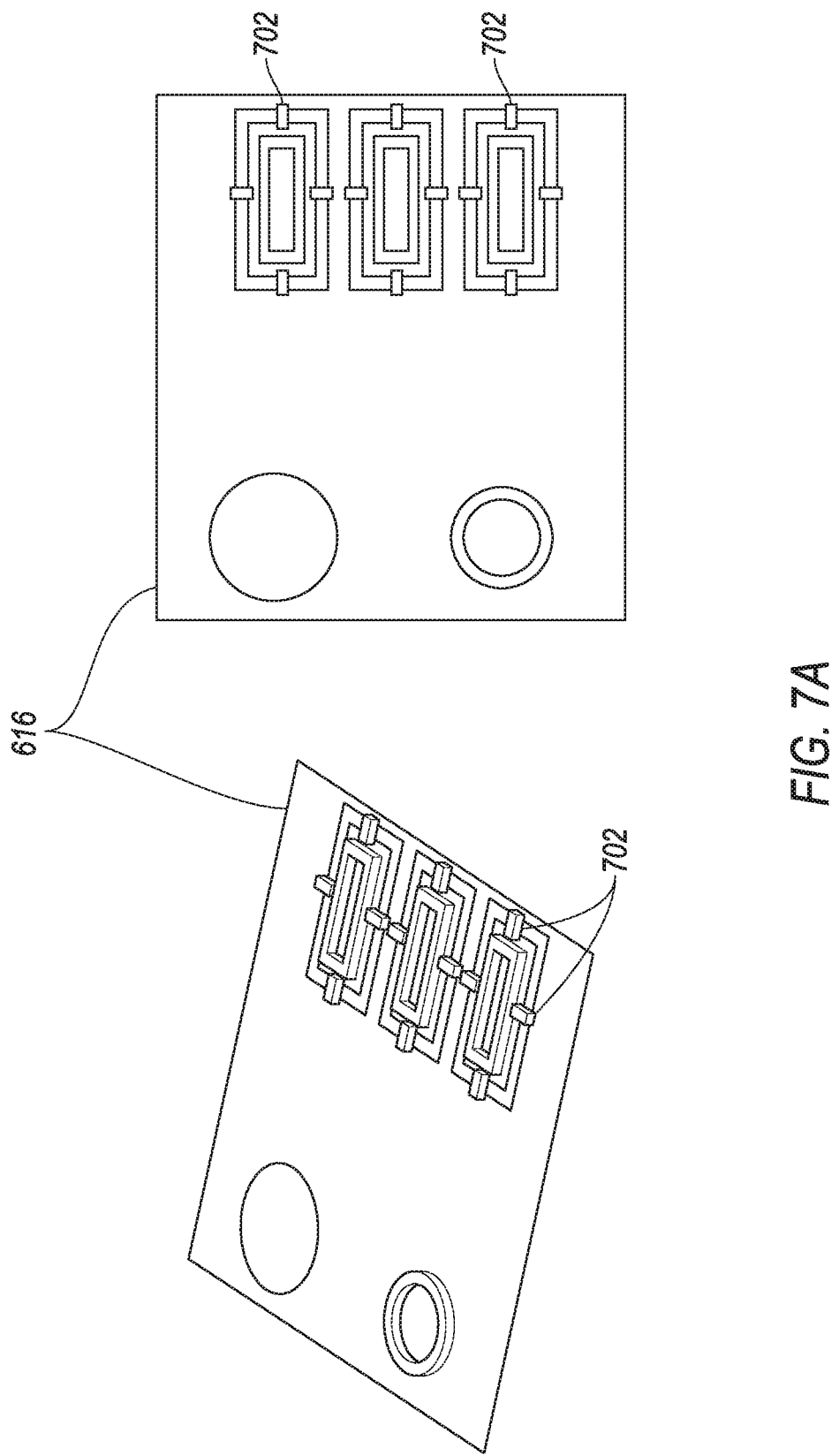
FIGS. 7A to 7C illustrate diagrams of a secondary busbar of one embodiment of the present disclosure.
Figure 7C:
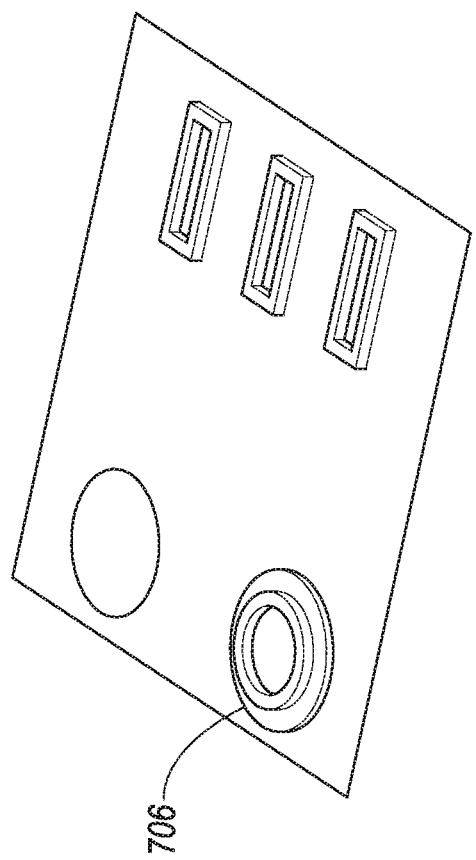
Figure 7B:
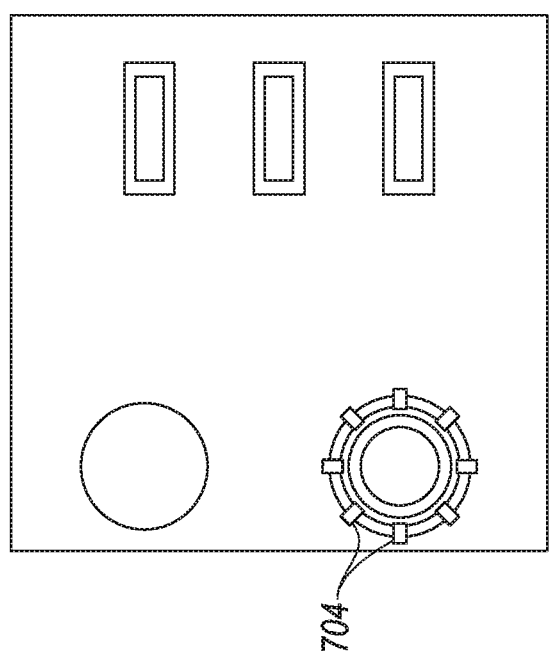

Referring to FIGS. 7A to 7C, diagrams of secondary busbars are illustrated. With continuing reference to FIGS. 6A and 6B, FIG. 7A illustrates an embodiment of the negative secondary busbar 616 having a plurality of discrete damping resistors 702 located near the rectangular terminal 622 for connecting to the power electronics module 616. Although each terminal 616 is associated with four discrete damping resistors 702 as illustrated in the present example, the present disclosure is not limited thereto and any numbers of resistors may be associated with each terminal. Additionally, each terminal 616 may be associated with a different number of discrete damping resistors 702 according to the specific design need. FIG. 7B illustrates another embodiment in which a plurality of damping resistors 704 are installed near the round terminal 616 for connecting to the capacitor bank 606. FIG. 7C illustrates yet another embodiment in which a high resistance section 706 is used in lieu of the discrete resistors 704 near the capacitor bank terminal 616. It is noted that although only the negative secondary busbar 616 is used to demonstrate the configuration of resistors in the present embodiment with reference to FIGS. 7A to 7C (as well as other embodiments with reference to other Figures), the present disclosure is not limited thereto and the same concept may similarly apply to the positive secondary busbar 614.

Figure 8:
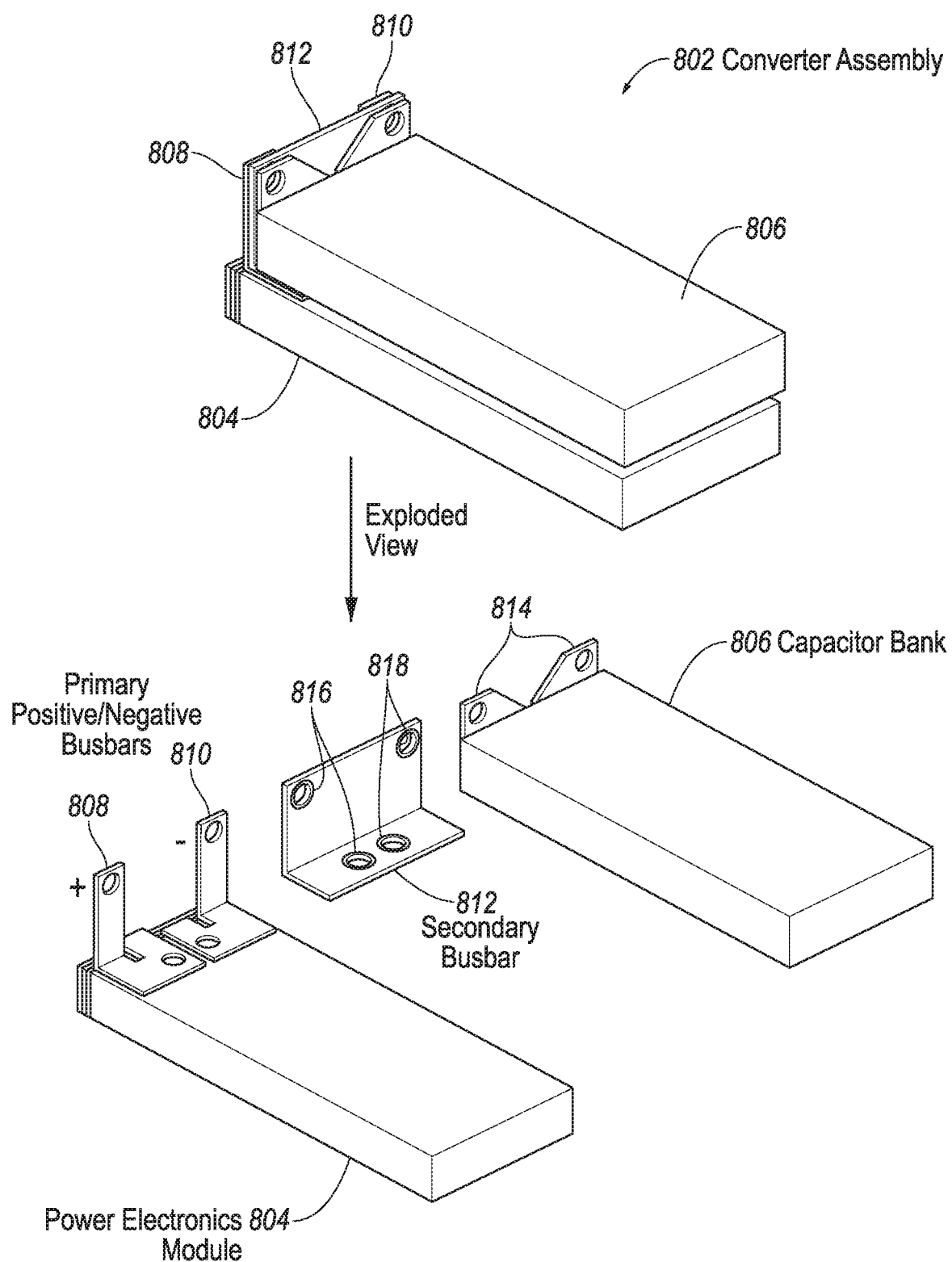
FIG. 8 illustrates a diagram of a power converter assembly having a secondary busbar of another embodiment of the present disclosure.

Referring to FIG. 8, an exploded view diagram of a converter assembly 802 having a secondary busbar of another embodiment of the present disclosure is illustrated. Similar to the converter assembly 802 illustrated in FIG. 6, the present converter assembly 802 includes a power electronics module 804 connected to a capacitor bank 806 via a positive primary busbar 808, a negative primary busbar 810, and a secondary busbar board 812. The positive and negative primary busbars 808 and 810 may be integrated with the power electronics module 804 and located on a same side of the secondary busbar board 812. The opposite side of the secondary busbar board 812 may be connected to terminals 814 of the capacitor bank. In other words, the secondary busbar board 812 is stacked between the positive/negative primary busbars 808, 810 and the capacitor bank 806 in the present embodiment. The secondary busbar board 812 may include various layers (not shown). The secondary busbar board 812 may further include one or more positive terminals 816 connected to the positive primary busbar 808 and one or more negative terminals 818 connected to the negative primary busbar 810.

Figure 9:
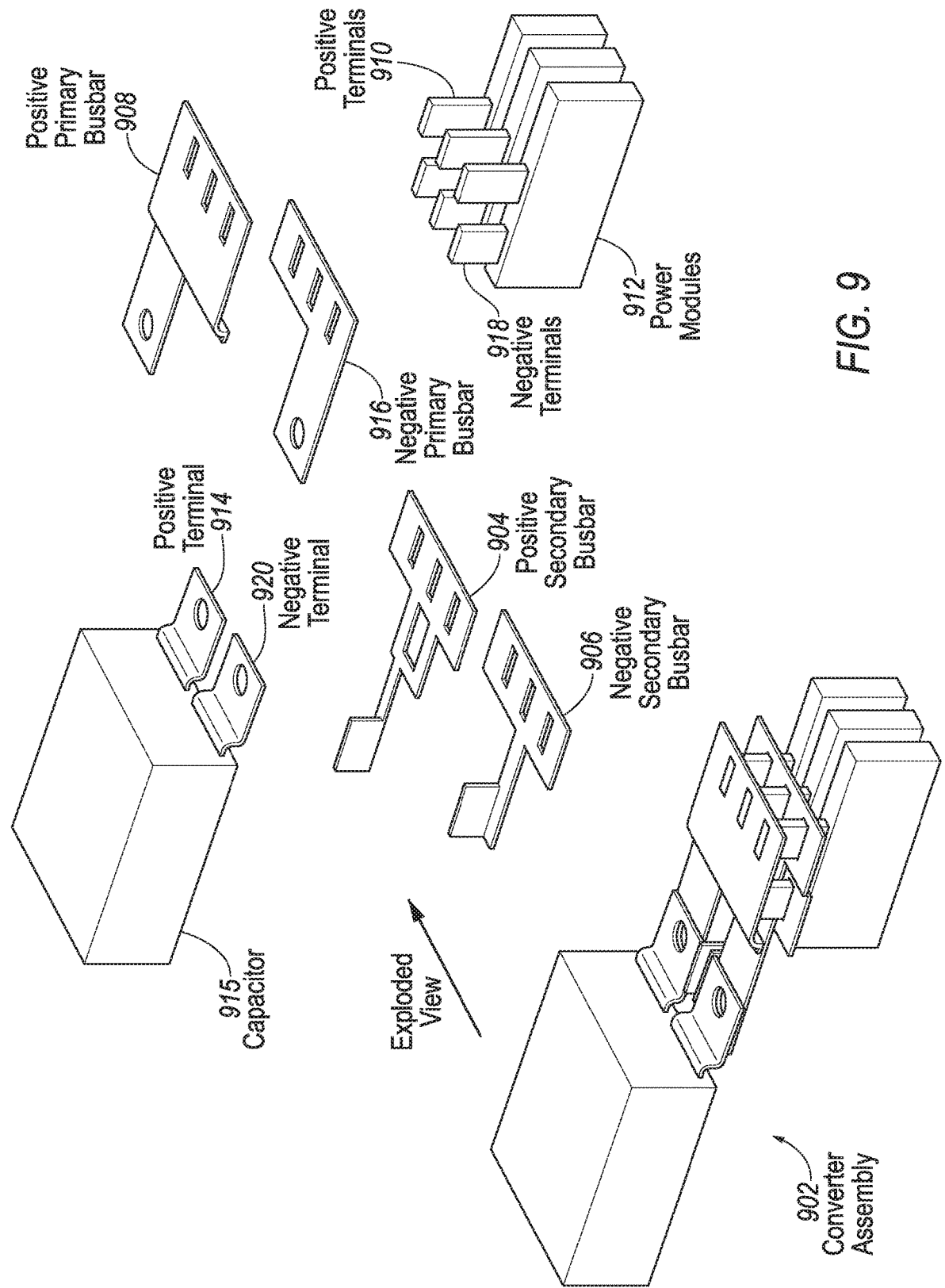
FIG. 9 illustrates a diagram of a power converter assembly having a secondary busbar of yet another embodiment of the present disclosure.

Referring to FIG. 9, an exploded view diagram of a converter assembly 902 having a secondary busbar of yet another embodiment of the present disclosure is illustrated. In the present example, the secondary busbar may include a positive secondary busbar 904 and a negative secondary busbar 906 separated from each other. The positive secondary busbar 904 may be connected in parallel to a positive primary busbar 908 between a positive terminal 910 of a power electronics module 912 and a positive terminal 914 of a capacitor bank 915. The negative busbar 906 may be connected in parallel to a negative primary busbar 916 between a negative terminal 918 of the power electronics module 912 and a negative terminal 920 of the capacitor bank. In the present embodiment, the positive and negative secondary busbars 904 and 906 may not require any insulation layer installed therebetween as the two busbars may be separated spatially without contacting each other when assembled.

Figure 10A:
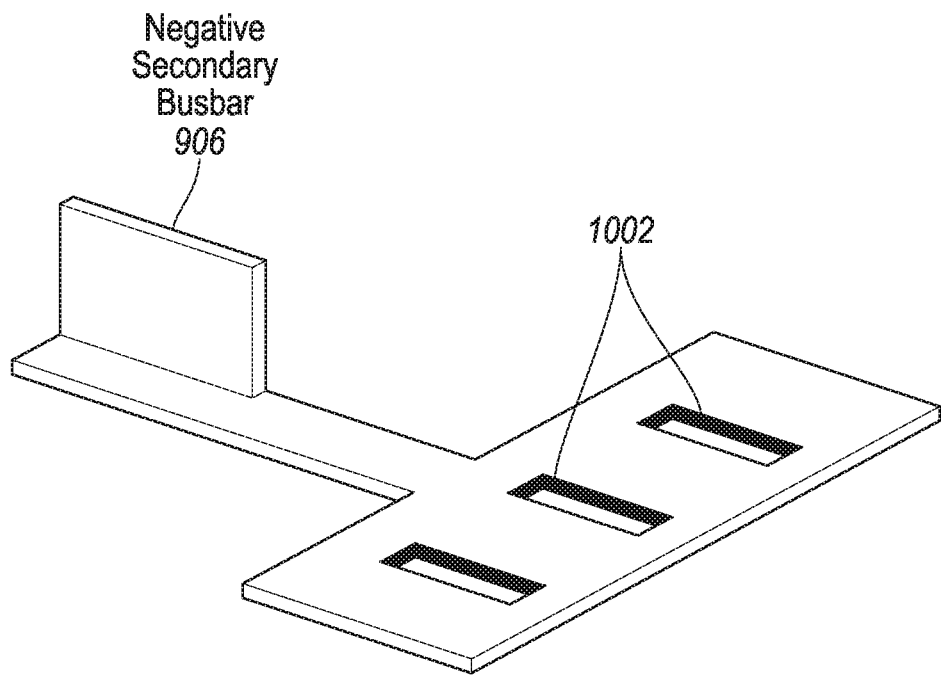
FIGS. 10A and 10B illustrate diagrams of a secondary busbar of yet another embodiment of the present disclosure.
Figure 10B:
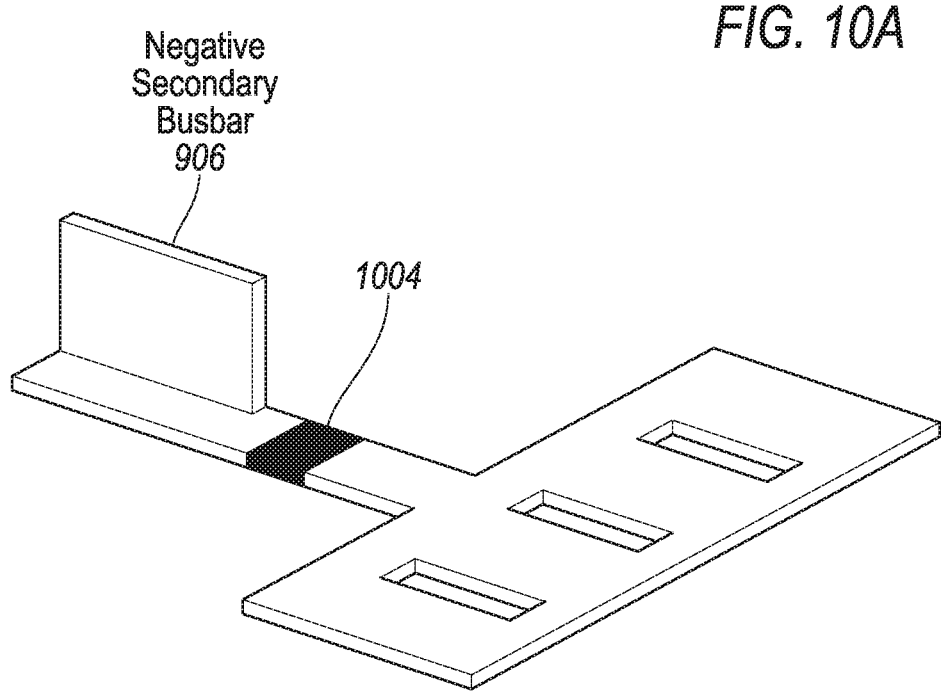

Referring to FIGS. 10A and 10B, diagrams of secondary busbars are illustrated. With continuing reference to FIG. 9, the resistor applied to the secondary busbars may be implemented in a variety of manners. Referring to an embodiment illustrated in FIG. 10A, the resistor may be implemented via a high resistance coating area 1002 on the positive and/or negative secondary busbar (only the negative secondary busbar 906 is illustrated) in contact with a terminal connected to power electronics modules 912. Alternatively, referring to an embodiment illustrated in FIG. 10B, the resistor may be implemented via a high resistance section 1004 on the secondary busbar.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery; and
a converter including a switch and first and second busbars electrically connected in parallel between the traction battery and switch, wherein the second busbar has an inductance less than the first busbar and includes a resistor having a resistance at least an order of magnitude greater than a resistance of the first busbar such that an impedance of the first busbar is greater than an impedance of the second busbar for a first predefined range of current frequencies, and less than the impedance of the second busbar for a second predefined range of current frequencies that is less than the first predefined range of current frequencies,
wherein the first busbar includes a positive first bus and a negative first bus, and the second busbar includes a positive second bus and a negative second bus that are integrated into a second busbar board having a plurality of insulation layers.

2. The vehicle of claim 1, wherein the second busbar board is stacked between the positive and negative first buses.

3. The vehicle of claim 1, wherein the positive and negative first buses are connected on a same side of the second busbar board.

4. The vehicle of claim 1, wherein the positive second bus and the negative second bus are spatially installed in the converter without an insulation layer.

5. The vehicle of claim 1, wherein the switch is a metal-oxide-semiconductor field-effect transistor (MOSFET).

6. The vehicle of claim 1, wherein the resistor has a resistance value between 4 Ω and 10 Ω.

7. The vehicle of claim 6, wherein the resistance of the first busbar is less than 1 mΩ.

8. A vehicle power system comprising:
a traction battery; and
a converter including a switch and first and second busbars electrically connected in parallel between the traction battery and switch, wherein the first busbar is configured to pass current having frequencies that fall within a first frequency range, and the second busbar is configured to pass current having frequencies that fall within a second frequency range greater than the first frequency range and to dissipate energy associated with the current having frequencies that fall within the second frequency range to damp a voltage response across terminals of the switch corresponding to the current having frequencies that fall within the second frequency range
wherein the second busbar has an inductance less than the first busbar and includes a resistor having a resistance at least an order of magnitude greater than a resistance of the first busbar, the first busbar includes a positive first bus and a negative first bus, and the second busbar includes a positive second bus and a negative second bus that are integrated into a second busbar board having a plurality of insulation layers.

9. The vehicle power system of claim 8, wherein the second busbar board is stacked between the positive and negative first buses when the converter is assembled.

10. The vehicle power system of claim 8, wherein the positive and negative first buses are connected on a same side of the second busbar board when the converter is assembled.

11. The vehicle power system of claim 8, wherein the positive second bus and the negative second bus are spatially installed in the converter without an insulation layer.

12. A converter comprising:
a switch; and
first and second busbars electrically connected in parallel and to the switch, wherein an impedance of the first busbar is greater than an impedance of the second busbar for a first predefined range of current frequencies, and less than the impedance of the second busbar for a second predefined range of current frequencies that is less than the first predefined range of current frequencies,
wherein the first busbar includes a positive first bus and a negative first bus, and the second busbar includes a positive second bus and a negative second bus that are integrated into a second busbar board having a plurality of insulation layers.

13. The converter of claim 12, wherein the second busbar has an inductance less than the first busbar and includes a resistor having a resistance at least an order of magnitude greater than a resistance of the first busbar.

* * * * *